Nov. 18, 1924.  
J. L. MESZAROS  
SIGNALING DEVICE  
Filed June 20, 1924
1,516,484
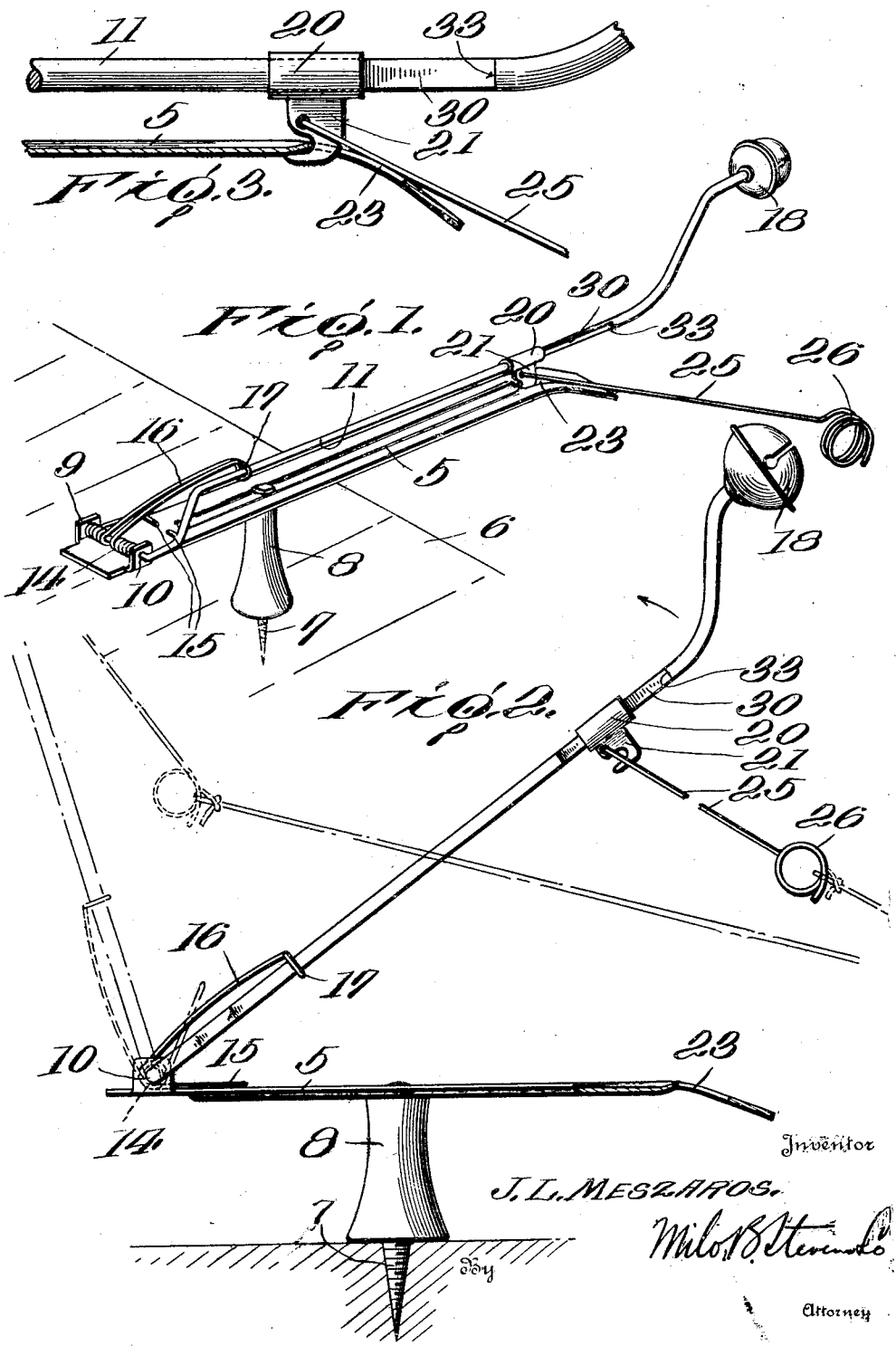
Inventor  
J. L. MESZAROS  
By Milo B. Stevens  
Attorney Patented Nov. 18, 1924.

1,516,484

UNITED STATES PATENT OFFICE.

JOSEPH L. MESZAROS, OF CHICAGO, ILLINOIS.

SIGNALING DEVICE.

Application filed June 20, 1924. Serial No. 721,346.

*To all whom it may concern:*

Be it known that I, JOSEPH L. MESZAROS, a subject of Hungary, residing at Chicago, in the county of Cook and State of Illinois, have invented new and useful Improvements in Signaling Devices, of which the following is a specification.

This invention relates to signaling devices especially adapted for use by fishermen.

Briefly stated an important object of this invention is to provide reliable means to indicate audibly to a fisherman when he has a bite on the fishing line so that he can immediately pull in the line and catch the fish. It might be added that this invention is especially useful in cases where the fisherman is drowsy or is not paying strict attention to the line.

A further object is to provide a signaling device for fishermen which is of highly simplified construction, durable in use, and is cheap to manufacture.

Other objects and advantages will be apparent during the course of the following description.

In the accompanying drawing forming a part of this application and in which like numerals are employed to designate like parts throughout the same.

Figure 1 is a perspective of the improved signal in use;

Fig. 2 is a side elevation of the same.

Fig. 3 is a fragmentary side elevation of the signal set.

In the drawing wherein for the purpose of illustration is shown a preferred embodiment of the invention, the numeral 5 designates a longitudinally corrugated body or base plate adapted to be secured to a wharf, a log or other suitable support 6 by means of a fastening device 7. A suitable spacing element 8 may be mounted on the screw or other fastening device 7 so that the base plate 5 is supported a suitable distance above the part 6 to which the device is applied.

As clearly illustrated in Fig. 1 the rear portion of the base is provided with a pair of spaced upstanding ears 9 through which the laterally directed end portion 10 of an arm 11 is extended. A coil spring 14 is wrapped about the laterally directed end portion 10 and has its terminal portions 15 engaged with the base plate 5 while its intermediate portion is extended forwardly to provide an arm engaging finger 16. The forward portion of the arm engaging finger is looped about the arm 11 as indicated at 17. It will be seen that the spring 14 will urge the arm 11 and the bell 18 carried by the terminal portion of the same to the dotted line position illustrated in Fig. 2.

A sleeve 20 is slidable on the intermediate portion of the arm 11 and is provided with a depending trigger 21 adapted to be received in a slot 23 in the base plate 5 and engaged with the rear end wall of the same so that the arm may be held in an approximately horizontal position against the tension of the coil spring 14. The trigger 21 also has connection with a trigger releasing arm or lever 25, the forward terminal portion of which is looped or coiled as indicated at 26 for the reception of the fishing line.

When the arm is held in its operative position by the trigger 21 the line engaging arm or lever 25 is extended over the rounded forward terminal portion of the base plate 5 so that when a fish pulls on the line the lever 25 will be rocked on the curved terminal portion of the base plate to release the trigger 21 from the base plate. When the trigger 21 thus releases the arm 11 the spring 14 immediately swings the arm to its rearmost position and the bell 18 is sounded for advising the fisherman that a pull has been exerted on the line by a fish. This not only gives a signal to the fisherman, but also exerts a substantial initial pull on the line so that the hook is caught in the jaw of the fish. This is important.

It is also important to observe that the arm 11 is reduced intermediate its ends and is formed with flat sides 30 by means of which turning of the sleeve 20 is prevented. Of course the side walls of the sleeve are also flattened. By flattening the side walls of the arm 11 as indicated at 30 shoulders 33 at the end portions of the flattened sides act to limit the sliding movement of the sleeve on the arm and consequently the sleeve is at all times maintained in a proper position to engage the base plate 5.

Having thus described the invention, what is claimed is:

1. A signal for fishermen comprising a base plate having attaching means, the rear portion of the plate being provided with ears, an arm having its rear portion off set and having a laterally directed pivot member extended through said ears, a spring mounted on said pivot member and engaged with said arm to urge the same rearwardly, a sleeve mounted for limited sliding movement on said arm and having a trigger to engage said base plate, a lever pivoted to said trigger and fulcruming on the forward end of said base plate, said lever being adapted for engagement with a fishing line, and a signal mounted on the forward portion of said arm.

2. A signal for fishermen comprising a base plate having attaching means, the rear portion of the plate being provided with ears, an arm having its rear portion off set and having a laterally directed pivot member extended through said ears, a spring mounted on said pivot member and engaged with said arm to urge the same rearwardly, a sleeve mounted for limited sliding movement on said arm and having a trigger to engage said base plate, and a lever pivoted to said trigger and fulcruming on the forward end of said base plate, said lever being adapted for engagement with a fishing line, and a signal mounted on the forward portion of said arm, there being means to hold the sleeve against turning on said arm.

3. A fisherman's signal comprising a longitudinally corrugated base plate having its forward portion formed with a slot and being rounded, a spring actuated arm pivoted to the base plate and having its forward portion flattened and provided with shoulders at the ends of the flattened portion, a sleeve, mounted on said flattened portion of the arm and limited in endwise movement by said shoulders, a trigger connected to said sleeve and adapted to be received in said slot, a lever pivoted to said trigger and fulcruming over the rounded end of said base plate, the forward portion of said lever being provided with a loop to receive a fishing line and a bell connected to said arm.

In testimony whereof I affix my signature.

JOSEPH L. MESZAROS.